United States Patent
Abhari et al.

(10) Patent No.: US 9,328,303 B2
(45) Date of Patent: May 3, 2016

(54) REDUCING PRESSURE DROP BUILDUP IN BIO-OIL HYDROPROCESSING REACTORS

(71) Applicant: REG SYNTHETIC FUELS, LLC, Ames, IA (US)

(72) Inventors: Ramin Abhari, Bixby, OK (US); Peter Havlik, Tulsa, OK (US); H. Lynn Tomlinson, Tusla, OK (US); Gary Roth, Bristow, OK (US); Tsungani Record, Sapupla, OK (US)

(73) Assignee: REG SYNTHETIC FUELS, LLC, Ames, IA (US)

( * ) Notice: Subject to any disclaimer, the term of this patent is extended or adjusted under 35 U.S.C. 154(b) by 536 days.

(21) Appl. No.: 13/800,746

(22) Filed: Mar. 13, 2013

(65) Prior Publication Data

US 2014/0261715 A1 Sep. 18, 2014

(51) Int. Cl.
*C10G 49/00* (2006.01)
*C10L 10/00* (2006.01)
*C10L 1/02* (2006.01)
*C10G 75/00* (2006.01)
*C10G 3/00* (2006.01)

(52) U.S. Cl.
CPC . *C10L 10/00* (2013.01); *C10G 3/45* (2013.01); *C10G 3/46* (2013.01); *C10G 3/50* (2013.01); *C10G 75/00* (2013.01); *C10L 1/02* (2013.01); *C10G 2300/4031* (2013.01); *C10G 2300/4075* (2013.01); *C10G 2300/802* (2013.01); *Y02P 30/20* (2015.11); *Y10T 137/0379* (2015.04)

(58) Field of Classification Search
CPC .............. C10G 3/45; C10G 3/46; C10G 3/50; C10G 75/00; C10G 49/002; C10G 49/005; C10G 2300/1011; C10G 2300/1014; C10G 2300/1018; C10G 2300/802
USPC .......................................................... 585/240
See application file for complete search history.

(56) References Cited

U.S. PATENT DOCUMENTS

| | | | |
|---|---|---|---|
| 2,093,159 | A | 9/1937 | Schmidt |
| 2,163,563 | A | 6/1939 | Schrauth |
| 2,915,447 | A | 12/1959 | Arabian |
| 3,144,404 | A | 8/1964 | Tyson |

(Continued)

FOREIGN PATENT DOCUMENTS

| | | |
|---|---|---|
| CA | 1313200 | 1/1993 |
| CA | 2149685 | 9/1999 |

(Continued)

OTHER PUBLICATIONS

Dunleavy, Elimination of Fouling in Catalyst Beds, Platinum Metals Review, 2005, 49, (3), 156.*

(Continued)

*Primary Examiner* — Michelle Stein
(74) *Attorney, Agent, or Firm* — Foley & Lardner LLP; James P. McParland; Joseph P. Meara

(57) ABSTRACT

A method is provided involving reducing a pressure drop across a hydroprocessing reactor having a reactor feed and producing a hydroprocessing product, where the reactor feed includes a bio-oil feed and a hydrocarbon diluent; and the step of reducing the pressure drop comprises stopping or substantially reducing the bio-oil feed supplied to the reactor and supplying the hydrocarbon diluent to the reactor with a mass flux of at least about 1,000 lb/hr/ft$^2$.

23 Claims, 2 Drawing Sheets

(56) References Cited

U.S. PATENT DOCUMENTS

| | | | |
|---|---|---|---|
| 3,363,022 A | 1/1968 | Harrison et al. | |
| 3,496,099 A | 2/1970 | Bridge | |
| 3,505,418 A | 4/1970 | Jubin | |
| 3,903,191 A | 9/1975 | Pollitzer | |
| 3,979,470 A | 9/1976 | Firnhaber et al. | |
| 4,049,686 A | 9/1977 | Ringers et al. | |
| 4,151,072 A | 4/1979 | Nowack et al. | |
| 4,233,140 A | 11/1980 | Antonelli et al. | |
| 4,252,634 A | 2/1981 | Khulbe et al. | |
| 4,300,006 A | 11/1981 | Nelson | |
| 4,300,009 A | 11/1981 | Haag et al. | |
| 4,431,524 A | 2/1984 | Norman | |
| 4,432,865 A | 2/1984 | Norman | |
| 4,451,689 A | 5/1984 | Pasky | |
| 4,512,878 A | 4/1985 | Reid et al. | |
| 4,571,442 A | 2/1986 | Cosyns et al. | |
| 4,594,172 A | 6/1986 | Sie | |
| 4,698,185 A | 10/1987 | Dijkstra et al. | |
| 4,734,226 A | 3/1988 | Parker et al. | |
| 4,746,420 A | 5/1988 | Darian et al. | |
| 4,913,794 A | 4/1990 | Le et al. | |
| 4,937,051 A | 6/1990 | Graven et al. | |
| 4,960,960 A | 10/1990 | Harrison et al. | |
| 4,992,605 A | 2/1991 | Craig et al. | |
| 5,037,528 A | 8/1991 | Garwood et al. | |
| 5,093,535 A | 3/1992 | Harrison et al. | |
| 5,105,015 A | 4/1992 | Lin et al. | |
| 5,135,638 A | 8/1992 | Miller | |
| 5,146,022 A | 9/1992 | Buchanan et al. | |
| 5,239,096 A | 8/1993 | Rohdenburg et al. | |
| 5,292,428 A | 3/1994 | Harrison et al. | |
| 5,298,639 A | 3/1994 | Toeneboehn et al. | |
| 5,475,160 A | 12/1995 | Singleton et al. | |
| 5,502,077 A | 3/1996 | Breivik et al. | |
| 5,578,090 A | 11/1996 | Bradin | |
| 5,647,226 A | 7/1997 | Scaringe et al. | |
| 5,705,722 A | 1/1998 | Monnier et al. | |
| 5,851,338 A | 12/1998 | Pushaw | |
| 5,877,358 A | 3/1999 | Garton et al. | |
| 5,882,505 A | 3/1999 | Wittenbrink et al. | |
| 5,906,729 A | 5/1999 | Chou | |
| 6,123,835 A | 9/2000 | Ackerson et al. | |
| 6,185,742 B1 | 2/2001 | Doherty | |
| 6,190,535 B1 | 2/2001 | Kalnes et al. | |
| 6,203,695 B1 | 3/2001 | Harle et al. | |
| 6,402,935 B1 | 6/2002 | Kalnes | |
| 6,518,473 B2 | 2/2003 | Miller et al. | |
| 6,574,971 B2 | 6/2003 | Suppes | |
| 6,638,418 B1 | 10/2003 | Kalnes et al. | |
| 6,660,812 B2 | 12/2003 | Kuechler et al. | |
| 6,846,778 B2 | 1/2005 | Johnson et al. | |
| 6,855,410 B2 | 2/2005 | Buckley | |
| 7,232,935 B2 | 6/2007 | Jakkula et al. | |
| 7,288,685 B2 | 10/2007 | Marker | |
| 7,511,181 B2 | 3/2009 | Petri et al. | |
| 7,550,634 B2 | 6/2009 | Yao et al. | |
| 7,691,159 B2 | 4/2010 | Li | |
| 7,718,051 B2 | 5/2010 | Ginosar et al. | |
| 7,754,931 B2 | 7/2010 | Monnier et al. | |
| 7,816,570 B2 | 10/2010 | Roberts et al. | |
| 7,836,722 B2 | 11/2010 | Magill et al. | |
| 7,846,323 B2 | 12/2010 | Abhari et al. | |
| 7,851,663 B2 | 12/2010 | Abhari | |
| 7,928,273 B2 | 4/2011 | Bradin | |
| 7,960,597 B2 | 6/2011 | Miller | |
| 7,968,757 B2 | 6/2011 | Abhari et al. | |
| 7,982,076 B2 | 7/2011 | Marker et al. | |
| 8,003,836 B2 | 8/2011 | Marker et al. | |
| 8,026,401 B2 | 9/2011 | Abhari et al. | |
| 8,187,344 B2 | 5/2012 | Jakkula et al. | |
| 8,212,094 B2 | 7/2012 | Myllyoja et al. | |
| 8,231,804 B2 | 7/2012 | Abhari | |
| 8,278,492 B2 | 10/2012 | Myllyoja et al. | |
| 2004/0055209 A1 | 3/2004 | Jakkula et al. | |
| 2004/0067856 A1 | 4/2004 | Johnson et al. | |
| 2004/0230085 A1 | 11/2004 | Jakkula et al. | |
| 2005/0150815 A1 | 7/2005 | Johnson et al. | |
| 2006/0161032 A1 | 7/2006 | Murzin et al. | |
| 2006/0186020 A1 | 8/2006 | Gomes | |
| 2006/0199984 A1 | 9/2006 | Kuechler et al. | |
| 2006/0207166 A1 | 9/2006 | Herskowitz et al. | |
| 2006/0264684 A1 | 11/2006 | Petri et al. | |
| 2007/0006523 A1 | 1/2007 | Myllyoja et al. | |
| 2007/0010682 A1* | 1/2007 | Myllyoja | C10G 45/02 554/174 |
| 2007/0026012 A1 | 2/2007 | DeLisa et al. | |
| 2007/0131579 A1 | 6/2007 | Koivusalmi et al. | |
| 2007/0161832 A1 | 7/2007 | Myllyoja et al. | |
| 2007/0170091 A1* | 7/2007 | Monnier | C10G 3/46 200/15 |
| 2007/0260102 A1 | 11/2007 | Duarte Santiago et al. | |
| 2008/0308458 A1 | 12/2008 | Dindi et al. | |
| 2009/0077866 A1 | 3/2009 | Kalnes et al. | |
| 2011/0138680 A1 | 6/2011 | Dandeu et al. | |
| 2012/0251424 A1 | 10/2012 | Havlik et al. | |

FOREIGN PATENT DOCUMENTS

| | | |
|---|---|---|
| CZ | 283575 | 5/1998 |
| DE | 41 16 905 | 8/1992 |
| EP | 0 794 241 | 3/1997 |
| EP | 1 728 844 | 12/2006 |
| GB | 2 090 611 | 7/1982 |
| IE | 921671 | 12/1995 |
| JP | 59-108088 | 6/1984 |
| SE | 9700149 | 8/1997 |
| SE | 520633 | 8/2003 |
| WO | WO-00/11117 | 3/2000 |
| WO | WO-00/29512 | 5/2000 |
| WO | WO-01/49812 | 7/2001 |
| WO | WO-03/022960 | 3/2003 |
| WO | WO-2004/026161 | 4/2004 |
| WO | WO-2004/104142 | 12/2004 |
| WO | WO-2005/026297 | 3/2005 |
| WO | WO-2006/100584 | 9/2006 |
| WO | WO-2007/063874 | 6/2007 |
| WO | WO-2007/068795 | 6/2007 |
| WO | WO-2008/027699 | 3/2008 |
| WO | WO-2008/054442 | 5/2008 |
| WO | WO-2008/058664 | 5/2008 |
| WO | WO-2008/067627 | 6/2008 |
| WO | WO-2009/085686 | 7/2009 |
| WO | WO-2009/117337 | 9/2009 |
| WO | WO-2009/151692 | 12/2009 |

OTHER PUBLICATIONS

Ali, et al., "Mineral Composition, Quality and Physico-chemical Parameters of the Local Tallow of Pakistan," Pakistan Journal of Nutrition, 7(5): 717-720, 2008.

American Petroleum Institute, Properties of Hydrocarbons of High Molecular Weight Synthesized by Research Project 42 of the American Petroleum Institute (1967).

ASTM International, Designation: D6751-11b, "Standard Specification for Biodiesel Fuel Blend Stock (B100) for Middle Distillate Fuels," Jul. 2011, pp. 1083-1091.

B.B. He and J. Van Gerpen "Biodiesel Quality Affected by Sulfur Content Originated by Different Feedstocks and a Database for the Same" Final Report KLK432 N08-04, National Institute for Advanced Transportation Technology, University of Idaho (Feb. 2008).

Bell, et al., "Biodiesel," TEAM Report for Imperial Oil, Queen's University, Kingston, Ontario, Apr. 2007. (106 pages).

CanmetENERGY's SuperCetane Technology, Natural Resources Canada, http://cetcvareness.nrcan.gc.ca/eng/industrialprocesses/industrialenergysystems, Nov. 2008, Accessed Jul. 19, 2013 (4 pages).

Connor, et al., "Hydrogenolysis of Oxygenated Organic Compounds," J. Am. Chem. Soc., 54(12), 1932, pp. 4678-4690.

Craig, et al., "A Marketing Survey of Worldwide Potential for Use of Vegetable Oil Conversion Products in Diesel Fuel," Saskatchewan Research Council, Oct. 1989 (182 pages).

(56) References Cited

OTHER PUBLICATIONS

Declaration of Jaques Monnier under 37 C.F.R. 1.132, dated Jan. 7, 2010, filed in U.S. Appl. No. 11/234,175.
Elliott, et al., "Hydrodeoxygenation of Wood-Derived Liquids to Produce Hydrocarbon Fuels," Proceedings of the 20th Intersociety Energy Conversion Engineering Conf., vol. 1 of 3, 1985. (9 pages).
File History of U.S. Appl. No. 08/269,090 to Monnier et al. (filed Jun. 30, 1994) (abandoned).
File History of U.S. Appl. No. 08/517,421 to Monnier et al. (filed Aug. 21, 1995) (continuation-inpart).
Food Fats and Oils, Inst. of Shortening and Edible Oils, 335-354 (9th Ed. 2006).
Ghosh, et al., "Detailed Composition-Based Model for Predicting the Cetane Number of Diesel Fuels," Ind. Eng. Chem. Res. 2006, 45, 346-351.
Goodfellow, J., "Animal Fat-Based Biodiesel: Explore Its Untapped Potential," Biodiesel Magazine, Feb. 10, 2009 (1 pages).
Goodfellow, J., "Biofuel Production From Animal Fats: A North American Perspective," Sanimax Energy (23 pages).
Gorshteyn, et al., "ExxonMobil Catalytic Dewaxing—A Commercial Proven Technology," Paper presented at the 2nd Russian Refining Technology Conference, Moscow, Sep. 26-27, 2002, 13 pages.
Gosselink, et al., "Mild Hydrotracking: Coping with Catalyst Deactivation," 34 Catalyst Deactivation, 279-287 (1987).
Haas, M., "Animal Fats," Baileys Industrial Oil and Fat Products, 6th Ed., vol. 1: Edible Oil and Fat Products: Chemistry, Properties, and Health Effects, 2005, pp. 161-212.
Hammami, et al., "Cloud Points: Can We Measure or Model Them?" Petroleum Science and Technology, vol. 21, Nos. 3 & 4, 2003, pp. 345-358.
Held, et al., "Production of Hydrocarbons from Biomass," Energy from Biomass: 3rd E.C. Conference, International Conference on Biomass, Venice, 1985 (7 pages).
J. Johnson, et al. "Emissions from Fischer-Tropsch Diesel Fuels" SAE Technical Paper 2001-01-3518 (published Sep. 24, 2001).
L. Rantanen, R. Linnaila, P. Aakko, and T. Harju "NExBTL—Biodiesel Fuel of the Next Generation" SAE Technical Paper 2005-01-3771 (published Oct. 24, 2005).
L.G. Huve "Shell Global Solutions Dewaxing Technologies & Catalysts Current Status" pp. 1-13., 2007.
Latondress, E.G., "Refining, Bleaching and Hydrogenating Meat Fats," JAOCS, vol. 62, No. 4, 1985, pp. 812-815.
Laurent, et al., "Study of the hydrodeoxygenation of carbonyl, carboxylic and guaiacyl groups over sulfided CoMo/ γ-Al2O3 and NiMo/ γ-Al2O3 catalyst," App. Catal. A 109, pp. 97-115 (1994).
Leng, et al., "Catalytic Conversion of Palm Oil to Fuels and Chemicals," The Canadian Journal of Chemical Engineering, vol. 77, Feb. 1999, pp. 156-162.
Long, et al., "A Simple Test to Detect Chlorophyll in Tallow," Presented before the 8th Annual Fall Meeting—A.O.C.S., Oil & Soap, 1935. (2 pages).
Neste Oil, NExBTL Renewable Synthetic Diesel, Cal Hodge handout presented at Climate Action Team Technology Symposium, Sacramento, California, Jun. 27-28, 2006, available at http://www.climatechange.ca.gov/events/2006-06-27 28_symposium/presentations/ (last modified May 7, 2008).
Properties of Isononane—High Quality Chemical Properties, Accessed at http://chemeo.com/cid/73-453-8 on Aug. 23, 2013 (2 pages).
Sandler, S., "Chemical and Engineering Thermodynamics," at 1-3, 324-33, 598-603 (3rd Ed. 1999).
Santana, et al., "Evaluation of Different Reaction Strategies for the Improvement of Cetane Number in Diesel Fuels," Fuel 85: 643-656 (2006).
Satterfield, C.N., Heterogeneous Catalysis in Industrial Practice, 2nd Edition, Sections 9.8-9.11, McGraw-Hill, Inc., NY (1991), pp. 375-389.
Sixth Canadian Bioenergy R&D Seminar, Richmond, B.C., 1987 (19 pages).
Smith, et al., "Introduction to Chemical Engineering Thermodynamics," 5th Ed., 1996, pp. 526-531.
Song, et al., Temperature Programmed Retention Indices for GC and GC-MS of Hydrocarbon Fuels and Simulated Distillation GC of Heavy Oils, Analytical Advances for Hydrocarbon Research, 147-210, 2003.
Standard Methods for the Analysis of Oils, Fats and Derivatives, 6th Ed., Part 1, pp. 96-108 (Pergamon Press 1979).
Stumborg, et al., "Catalytic Conversion of Vegetable Oils to Diesel Additives," Energy from Biomass and Wastes XVI, pp. 721-738, 1993.
Tempier, et al., "Identifying Environmentally Preferable Uses for Biomass Resources," Ch. 4, (Mar. 31, 2004).
Widmor, et al., "Prediction of the Freeze Point Temperature of Jet Fuel Using a Thermodynamic Model," Petroleum Chem. Div. Preprints, 47(3): 329-242 (2002).
Wong, A., ARBO-TANE, The Green Diesel Fuel, Naval Stores Review 14-15 (Jul./Aug. 1991).
Wong, et al., Bio-Based Cetane Enhancer for Diesel Fuels, BioEnergy 1998: Great Lakes Regional Biomass Energy Progarm. (12 pages).
Wong, Tall Oil-Based Cetane Enhancer for Diesel Fuel, in 79th Annual Meeting, Technical Section, Canadian Pulp and Paper Association, Preprints "A", A313-A318, held Jan. 26-27, 1993.
Abhari et al., "New Routes to Ethylene," EEPC Seminar in Berlin, Germany, Oct. 20-22, 2010, pp. 1-38.
Ali et al., "Fuel Properties of Tallow and Soybean Oil Esters," JAOCS, 1995, vol. 72, No. 12.
Antoniassi, R. et al, "Pretreatment of Corn Oil for Physical Refining," JAOCS, vol. 75, No. 10, 1998, pp. 1411-1415.
Arroyo et al., "Hydrocracking and isomerization of n-paraffin mixtures and a hydrotreated gasoil on Pt/ZSM-22: confirmation of pore mouth and key013lock catalysis in liquid phase," Applied Catalysis A: General 192, 2000, pp. 9-22.
ASTM International, "Standard Specification for Diesel Fuel Oil", Designation: D975-12, printed Nov. 9, 2012, 26 pages.
Batts et al., "A Literature Review on Fuel Stability Studies with Particular Emphasis on Diesel Oil", Energy & Fuels, 1991, vol. 5, pp. 2-21.
Beare-Rogers, J. et al, "Lexicon of Lipid Nutrition," Pure and Applied Chemistry, vol. 73, No. 4, 2001, pp. 685-744.
Bergerioux, C. et al, "Determination of Trace Element Pathways in a Petroleum Distillation Unit by Instrumental Neutron Activation Analysis," Journal of Radioanalytical Chemistry, vol. 54, No. 1-2,1979, pp. 255-265.
Burch et al., "Melting-Point Models of Alkanes", J. Chem. Eng. Data 2004, 49, 858-863.
Canada Centre for Mineral and Energy Technology, "New Process Yields Cleaner Diesel", Canmet'95: New Directions, 1995, p. 14.
Canakci et al., "Biodiesel Production from Oils and Fats with High Free Fatty Acids", Transactions of the ASAE, 2001, vol. 44(6), pp. 1429-1436.
Clements, L.D., "Blending Rules for Formulating Biodiesel Fluid.", Proceedings of the Third Liquid Fuels Conference, Sep. 15-17, 1996, pp. 44-53.
Cmolik et al., "Effects of plant-scale alkali refining and physical refining on the quality of rapeseed oil", Eur. J. Lipod Sci. Technol. 2000, 15-22.
Cooper et al., "Production of Swedish Class I Diesel Using Dual-Stage Process", Catalytic Hydroprocessing of Petroleum and Distillates, based on Proceedings of the AIChE Spring National Meeting, Houston, Texas, Mar. 28-Apr. 1, 1993, 279-290.
Corma, et al., "Transformation of Alkanes on Solid Acid and Bifunctional Catalysts", Catalytic Activation and Functionalisation of Light Alkanes: Advances and Challenges, Editors E.G. Derouane et al., 1998, Netherlands: Kluwer Academic Publishers, vol. 44, pp. 35-74.
Criterion, "Technical Bulletin: CRITERION* Hydrotreating Catalyst In-Situ Presulphiding Guidelines—Liquid Phase (Preferred method)—Gase Phase (alternative method)" Criterion Catalysts, Aug. 1998, 1-9.
Deem, A.G. et al, "Catalytic Poisoning in Liquid-Phase Hydrogenation," Industrial and Engineering Chemistry, vol. 33, No. 11, Nov. 1941, pp. 1373-1376.

(56) References Cited

OTHER PUBLICATIONS

Del Gallo et. al. "Comparison of the Effects of Nitrogen Poisoning on Molybdenum Oxycarbide and Pt/B-Zeolite Catalysts in the Isomerization of n-Heptane," Ind. Eng. Chem. Res., 1996, vol. 35, No. 10, pp. 3302-3310.
Derrien et al., "The IFP Selective Hydrogenation Process", Chemical Engineering Process, vol. 70, No. 1, Jan. 1974, 74-80.
Doty, D.M. (1971). "Removal of Polyethylene and Other Polymeric Materials from Rendered Animal Fat." The Directors Digest, Fats and Proteins Research Foundation, Inc., 90, 4 pgs.
Dynamic Fuels, "About", http://www.dynamicfuelsllc.com/. Accessed Nov. 12, 2012, 8 pages.
Dynamic Fuels, "Compare", http://www.dynamicfuelsllc.com/. Accessed Nov. 12, 2012, 7 pages.
Dynamic Fuels, "Frequently Ask Questions," http://dynamicfuelsllc.com/wpnews/frequently-ask-questions/, Accessed Nov. 12, 2012, 4 pages.
Edgar et al., "Analysis is key to hydrotreater troubleshooting", Oil & Gas Journal, vol. 82, issue 23, Jun. 4, 1984, 67-70.
Egeberg et al., "Hydrotreating in the Production of Green Diesel," Digital Refining, Apr. 2010, 13 pages; Available for download at http://www.digitalrefining.com/article/1000156,Hydrotreating_in_the_production_of_green_diesel.html#.UcSCEKybWVo.
Egeberg, et al., "Novel Hydrotreating Technology for Production of Green Diesel," 14th European Refining Technology Conference, Berlin, Germany, Nov. 9-11, 2009, 21 pages.
Erickson et al., "Soybean Oil Modern Processing and Utilization", American Soybean Association, 1990, 20 pages.
Feng et al., "Chemical Composition of Tall-Oil Based Cetane Enhancer for Diesel Fuels", First Biomass Conference of The Americas: Energy, Environment, Agriculture, and Industry, Aug. 30-Sep. 2, 1993. 14 pages.
Filho et al., Catalytic Conversion of Hevea brasiliensis and Virola sebifera Oils to Hydrocarbon Fuels, JAOCS, vol. 69, No. 3, Mar. 1992, 266-271.
Galeana et al., "Thermodynamics of Wax Precipitation in Petroleum Mixtures," AIChE Journal, 1996, vol. 42, No. 1, pp. 239-248.
Galperin, "Hydroisomerization of N-decane in the presence of sulfur and nitrogen compounds," Applied Catalysis A: General, 209, 2001 pp. 257-268.
Garrido et al., "Concentrations of Metal in vegetable edible oils", Food Chemistry, vol. 50, 1994, 237-243.
Goering et al., "Fuel Properties of Eleven Vegetable Oils," Transactions of the ASAE, 1982, pp. 1472-1477, 1483.
Goodrum et al., "Rheological Characterization of Yellow Grease and Poultry Fat," JAOCS, 2002, vol. 79, No. 10, pp. 961-964.
Groschen, R., "Overview of: The Feasibility of Biodiesel from Waste/Recycled Greases and Animal Fats", Marketing Services Division, Minnesota Department of Agriculture, Oct. 2002, 28 pages.
Gusmao et al., "Utilization of Vegetable Oils as an Alternative Source for Diesel-Type Fuel," Catalysis Today, 5, 1989, pp. 533-544.
Herrera et al., "Catalyst Selection for Hydrotreating Diesel Fuel from Residue Hydrocracking", ACS Preprints, 1992, vol. 37, No. 4, pp. 1855-1863.
Hill, C., An Introduction to Chemical Engineering Kinetics & Reactor Design, John Wiley & Sons, Inc., 1977, pp. 349-380, 382-387.
Holmgren, et al., "New Developments in Renewable Fuels Offer More Choices", Hydrocarbon Processing, Sep. 2007, pp. 67-72.
Iki, et al., "Applicability of Hydrogenated Palm Oil for Automotive Fuels", 16th Saudi Arabia-Japen Joint Symposium, Dhahran, Saudi Arabia, Nov. 5-6, 2006, 10 pages.
Kalnes, et al.; Provisional U.S. Appl. No. 60/973,788, entitled "Production of Diesel Fuel from Biorenewable Feedstocks", filed Sep. 9, 2007.
Kent, J., "Table 8.2", Riegel's Handbook of Industrial Chemistry, 9th Edition, 1992, pp. 278-279.
Kirk-Othmer, "Gravity Concentration to Hydrogen Energy", Encyclopedia of Chemical Technology, Third Edition, vol. 12, Copyright 1980 by John Wiley & Sons, Inc., 931-937.
Klimisch et al., "Paraffinic Naphthas", American Petroleum Institute, May 20, 2003, 41 pages.
Kriz, et al., "Catalysts for the Isomerization of C7 Paraffins," Ind. Eng. Chem. Res., 1998, 37:4560-4569.
Levenspiel, O., Chemical Reaction Engineering, Third Edition, John Wiley & Sons, Inc., 1999, pp. 207-239.
Lewis, R.J., Hawley's Condensed Chemical Dictionary, 12th Edition, 1993, p. 907.
Long et al., "Noble Metal (Pt, Rh, Pd) Promoted Fe-ZSM-5 for Selective Catalytic Oxidation of Ammonia to N2 at Low Temperatures", Catalysis Letters, Mar. 2002, vol. 78, Nos. 1-4, pp. 353-357.
MacDonald, "Fuel From Fats," enerG Alternative Sources Magazine, Sep./Oct. 2011, 4 pages.
Mag, T., "Canola Seed and Oil Processing", Canola Council of Canada, 1994, 6 pages.
Mansfield Fuels, "Norfolk Southern Pens Deal with Dynamic Fuels and Mansfield Oil", http://www.mansfieldoil.com/latest-news-a-press/524-norfolk-southern-pens-deal-with-dynamic-fueis-and-mansfield-oil.html, Accessed Nov. 12, 2012, 2 pages.
Marker, T.L., "Opportunities for Biorenewables in Oil Refineries Final Technical Report" submitted to U.S. Department of Energy, Apr. 2005, 60 pages.
Miller, "Studies on Wax Isomerization for Lubes and Fuels, Zeolited and Related Microporous Materials: State of the Art in 1994," Studies in Surface Science and Catalysts, 1994, vol. 84, pp. 2319-2326.
Mirante et al., "Cloud point prediction of fuels and fuel blends," Fluid Phase Equilibria 180, 2001, pp. 247-255.
Moyse, "Graded Catalyst Systems to Combat Bed-Fouling Problems", Haldor Topsoe, Inc. 1996, 16 pages.
Plantenga et al., "Specialized guard-bed technology can improve resid unit operation", Oil & Gas Journal, Oct. 21, 1991, 74-78.
Pope et al., "A Study of Catalyst Formulations for Isomerization of C7 Hydrocarbons", Applied Catalysis A: General 233, 2002, pp. 45-62.
Prakash, "A Critical Review of Biodiesel As a Transportation Fuel in Canada", Mar. 25, 1998, 163 pages.
Proctor & Gamble, "Better Rendering, A Manual Prepared by Proctor & Gamble", 2nd Ed., 1967, pp. ix-xi, 1-21.
Przybylski,R., "Canola Oil: Physical and Chemical Properties", Canola Council of Canada, 1998, 12 pages.
Rahimi et al., "Effect of Hydrotreating on the Stability of Synthetic Crude from Western Canada,"Symposium on Stability and Oxidation Chemistry of Fuels, Dallas, Spring 1998, ACS Fuels 43 (1), pp. 13-17; Available for download at http://web.anl.gov/PCS/acsfuel/preprint%20archive/43_1_DALLAS_03-98.htm.
Sanford et al., "Improved Catalyst Loading Reduces Guard Reactor Fouling", Oil & Gas Journal, Dec. 19, 1988, pp. 35-41.
Sharma, S.D., et al.; "Latent Heat Storage Materials and Systems: A Review"; International Journal of Green Energy; 2:1-56; 2005.
Simacek, et al., "Hydroprocessed rapeseed oil as a source of hydrocarbon-based biodiesel", Fuel 88, 2009, 456-460.
Smejkal, et al., "Thermodynamic balance in reaction system of total vegetable oil hydrogenation", Chemical Engineering Journal 146 (2009) 155-160.
Soveran et al., "The Effect on Diesel Engine Emissions with High Cetane Additives From Biomass Oils," Proc. American Chemical Society (Division of Fuel Chemistry) Meeting San Francisco, CA, Apr. 1992, pp. 74-85.
Spataru, "AGTANE (AGricultural ceTANE): An Economically Viable Bioenergy Product for Compression Ignited Engines", Fuel Chemistry Division Preprints, 2002, vol. 47(1), p. 365.
Spataru, "Is There a Future for Yellow Grease as a Fuel Additive?," Render, Feb. 2001, pp. 12-14.
Spataru, et al., "AGTANE (AGricultural ceTANE): An economically viable bioenergy product for compression ignited engines," 5th International Biomass Conference of the Americas Sep. 21, 2001, 2 pages.
Stork, W.H.J., "Molecules, catalysts and reactors in hydroprocessing of oil fractions", Hydrotreatment and Hydrocracking of oil fractions, 1997 Elsevier Science B.V., 41-67.
Stumborg et al., "Hydroprocessed Vegetable Oils for Diesel Fuel Improvement." Bioresources Technology, 1996, vol. 56, pp. 13-18.

(56) References Cited

OTHER PUBLICATIONS

Syntroleum webpage, "Bio-Synfining—Dynamic Fuels Plant"; http://www.b2i.us/profiles/investor/fullpage.asp?BzID=2029&to=cp&Nav=0&LangID=1&s=0&ID=11923, Accessed Nov. 21, 2012, 4 pages.

Table 4a. U.S. Crude Oil and Liquid Fuels Supply, Consumption and Inventories, Dec. 2012, 1 pp.

Taylor et al., Modern Advanced Control Pays Back Rapidly, Hydrocarbon Processing, Sep. 2000 issue, pp. 47-50.

Tyson et al., "Biomass Oil Analysis: Research needs and Recommendations," NREL Technical Report, Jun. 2004, 116 pages.

U.S. Dept. of Agriculture—Oilseeds: World Markets and Trade, "Soybean Oil and Palm Oil Account for an Increasing Share of Word Vegetable Oil Consumption", (2003), 27 pages.

U.S. Natural Gas Wellhead Price data and graph from U.S. Energy Information Administration, released Nov. 30, 2012, 1 pp; Available for download at http://www.eia.gov/dnav/ng/ng_pri_sum_dcu_nus_m.htm.

Vajo, et al., "Steady-State Decomposition of Ammonia on the Pt(110)-(1×2) Surface", The Journal of Physical Chemistry, 1986, vol. 90, No. 24, pp. 6531-6535.

Wong et al., "Conversion of Vegetable Oils and Animal Fats Into Paraffinic Cetane Enhancers for Diesel Fuels," Second Biomass Conference of the Americas: Energy, Environment, Agriculture, and Industry, 1995, pp. 901-910.

Wong, A., et al.; "Technical and Economic Aspects of Manufacturing Cetane-Enhanced Diesel Fuel from Canola Oil"; Bio-Oils Symposium; Saskatoon, Saskatchewan, Canada; Mar. 2-3, 1994.

Plantenga, F. L., et al., "Nebula": A Hydroprocessing Catalyst with Breakthrough Activity, Stud. Surf. Sci. Catal. vol. 145, 2003, pp. 407-410; http://dx.doi.org/10.1016/S0167-2991(03)80246-X.

First Declaration of Dr. Edward L. Sughrue II dated Mar. 7, 2013 in IPR2013-00178 of U.S. Pat. No. 8,212,094 (22 pages). (U.S. Pat. No. 8,212,094 is a division of Myllyoja (US 2007/0010682), cited by the Examiner in the present application on Sep. 10, 2015).

Second Declaration of Dr. Edward L. Sughrue II dated Jan. 13, 2014 in IPR2013-00178 of U.S. Pat. No. 8,212,094 (63 pages). (U.S. Pat. No. 8,212,094 is a division of Myllyoja (US 2007/0010682), cited by the Examiner in the present application on Sep. 10, 2015).

Transcript of First Deposition of Dr. Edward L. Sughrue II on Nov. 1, 2013 in IPR2013-00178 of U.S. Pat. No. 8,212,094 (121 pages). (U.S. Pat. No. 8,212,094 is a division of Myllyoja (US 2007/0010682), cited by the Examiner in the present application on Sep. 10, 2015).

Transcript of Second Deposition of Dr. Edward L. Sughrue II on Feb. 5, 2014 in IPR2013-00178 of U.S. Pat. No. 8,212,094 (116 pages). (U.S. Pat. No. 8,212,094 is a division of Myllyoja (US 2007/0010682), cited by the Examiner in the present application on Sep. 10, 2015).

Final Written Decision dated Aug. 29, 2014 in IPR2013-00178 of U.S. Pat. No. 8,212,094 (22 pages). (U.S. Pat. No. 8,212,094 is a division of Myllyoja (US 2007/0010682), cited by the Examiner in the present application on Sep. 10, 2015).

* cited by examiner

REDUCING PRESSURE DROP BUILDUP IN BIO-OIL HYDROPROCESSING REACTORS

FIELD

This technology relates generally to the field of renewable fuels and chemicals. More particularly, the technology relates to hydroprocessing of bio-oils and mitigating pressure drop buildup in bio-oil hydroprocessing reactors.

BACKGROUND

Fixed bed reactors are commonly used in the refining and chemical industries for chemical conversion operations. These reactors are vessels with catalysts packed therein. The feed typically flows down through the reactor where it comes into contact with the catalyst and undergoes the desired conversion reactions. When these involve reaction with hydrogen ($H_2$), the term hydroprocessing or hydroconversion is used.

Hydroprocessing reactions include addition of hydrogen ($H_2$) to a feed molecule to achieve reduction chemistry (hydrogenation) and can also involve cleavage of the molecule ("destructive hydrogenation" or hydrogenolysis). Hydrogenation reactions include saturation of carbon-carbon double bonds (e.g. conversion of olefins to paraffins; benzene rings to cyclohexane rings) and functional group transformations (e.g. conversion of aldehydes to alcohols; nitro compounds to amines).

Examples of hydrogenolysis reactions include conversion of organo-sulfur compounds such as mercaptans to paraffins and hydrogen sulfide, wherein the sulfur atom is cleaved off the feed molecules. Other examples include conversion of organo-nitrogen compounds and organo-oxygen compounds (also referred to as oxygenates) to hydrocarbons, wherein the nitrogen and oxygen atoms in the feed molecules are cleaved as ammonia and water/carbon oxides, respectively. In the refining industry, this class of hydroprocessing reactions is referred to as hydrotreating. Hydrotreating reactions are typically used to remove heteroatoms such as sulfur, nitrogen, and oxygen from hydrocarbons. Depending on the heteroatom removed, the hydrotreating operation may be referred to as hydrodesulfurization (HDS), hydrodeoxygenation (HDO), or hydrodentirogenation (HDN).

Other hydroprocessing reactions include hydrocracking, wherein a large feed molecule breaks into smaller molecules, and hydroisomerization, wherein a straight-chain molecule is converted to a branched molecule of substantially the same average molecular weight and a similar boiling point range. More than one hydroprocessing reaction may take place at the same time in the presence of a single catalyst. When the goal is improving the quality of a fuel stock (e.g. improvement of emission characteristics, low temperature flow properties, or thermo-oxidative stability), hydroprocessing operations are also referred to as "upgrading."

Although most hydroprocessing deals with upgrading of petroleum fractions, its use in biofuel production processes has attracted much interest over the past several years.

During hydroprocessing of both petroleum fractions and bio-oils, the pressure drop across the fixed bed reactor rises with time on stream. Without being bound by theory, this is believed to be due to deposition of solids present in the feed as well as the deposition of solids formed during thermal and/or chemical conversion of the liquid feed. Examples of the former include suspended solids that were not filtered upstream of the reactor or solids that drop out of solution, while the latter includes coke and polymerization products. In either case, as solids fill the reactor void (fouling the reactor, hence the term "foulant") the pressure drop rises. The foulant produced by petroleum hydroprocessing cannot be removed through use of an organic solvent or other dispersing agent. Once the maximum safe operating pressure drop is reached, the reactor needs to be shut down and the deposits skimmed (physically removed from the reactor when accumulating at the top) or the catalyst replaced (even if the catalyst is still active).

There are various options for mitigating fouling and pressure drop in fixed bed hydroprocessing reactors. One such option includes grading the bed with several layers of catalyst/inert media, with the largest on top and smallest in the bottom. Instead of concentration of the solids in the top section of the reactor resulting in a more rapid pressure drop increase, by grading the bed the solids tend to spread out within the graded section of the reactor.

Another option involves using a fixed bed reactor media in the form of wagon wheels, Raschig rings, and other shapes having high void fractions ("high void" means typically 50% or higher void fraction). Reactors containing top layers of these media can hold more solids before reaching the pressure drop limit. These high void media, including high void/low activity catalysts (e.g. "active rings"), may be graded to provide systems achieving significantly longer pressure drop limited run lengths. "Low activity catalysts" are those catalysts with less than 5 wt % of the active catalytic metal. Some of the top bed grading media contains internal macro-porosity capable of capturing very fine particulates that can nonetheless agglomerate within the fixed bed reactor void space and cause pressure drop issues.

An internal bypass apparatus for fixed bed reactors is another option. The bypass can include pipes which allow a hydrotreater feed to bypass the fouled section of the reactor so that nothing runs through the fouled section. The pipes can be equipped with rupture disks that burst open when the pressure drop reaches a value just below the operating limit, thus extending run length.

Although the above pressure drop mitigation methods and equipment can be useful for hydroprocessing reactor feeds comprising bio-oils, additional methods more suitable for solid deposits characteristic of bio-oils are desirable.

SUMMARY

In one aspect, a method is provided comprising reducing a pressure drop across a hydroprocessing reactor having a reactor feed and producing a hydroprocessing product, where the reactor feed includes a bio-oil feed and a hydrocarbon diluent; and the step of reducing the pressure drop includes stopping or substantially reducing the bio-oil feed supplied to the hydroprocessing reactor and supplying the hydrocarbon diluent to the reactor to generate a mass flux of at least about 1,000 lb/hr/ft$^2$. In some embodiments, the mass flux is from about 1,000 lb/hr/ft$^2$ to about 10,000 lb/hr/ft$^2$. In some embodiments, the mass flux is at least about 2,000 lb/hr/ft$^2$. In some embodiments, the hydrocarbon diluent comprises the hydroprocessing product of the hydroprocessing reactor. In some embodiments, the bio-oil feed supplied to the reactor is substantially reduced.

In some embodiments, the reduction of the pressure drop is performed after 100 to 10,000 reactor volumes of bio-oil have been processed. In some embodiments, the reduction of the pressure drop is performed after the rate of ΔP increase is about 0.1 psi/hr. In some embodiments, the method is performed periodically. In some embodiments, the periodic reduction of the pressure drop is performed after about 2 days to about 12 months since either the start of hydroprocessing or the last reduction of pressure drop.

In some embodiments, substantially reducing the bio-oil feed includes supplying the hydrocarbon diluent to the hydroprocessing reactor at a volumetric ratio of at least 10:1 of hydrocarbon diluent to bio-oil. In some embodiments, substantially reducing the bio-oil feed includes supplying the hydrocarbon diluent to the hydroprocessing reactor at a volumetric ratio of at least 15:1 hydrocarbon diluent to bio-oil. In some embodiments, the hydrocarbon diluent is supplied at a temperature of about 400° F. to about 800° F. In some embodiments, the hydrocarbon diluent has a boiling point range of about 300° F. to about 800° F. In some embodiments, the step of reducing the pressure drop does not interrupt production of the hydroprocessing product.

In some embodiments, the bio-oil includes a lipid, a carboxylic acid, a plant oil, animal fat, algal oil, a distillate from the fermentation of sugars, a liquid fraction derived from the fast pyrolysis of biomass, or a mixture of any two or more thereof. In some embodiments, the plant oil or animal fat contains nitrogen, sulfur, or phosphorus from about 0.1 wppm to about 30,000 wppm. In some embodiments, the bio-oil comprises a liquid fraction from the fast pyrolysis of biomass. In some embodiments, the liquid fraction is derived from ground wood, ground switch grass, or combinations thereof.

In some embodiments, the hydroprocessing reactor comprises a graded bed. In some embodiments, the graded bed comprises high void and high macro-porosity media. In some embodiments, the graded bed comprises a catalyst that includes Co, Mo, Ni, Pt, Pd, Ru, W, NiMo, NiW, CoMo, or combinations of any two or more thereof. In some embodiments, the reactor feed further includes a hydrogen gas. In some embodiments, the hydroprocessing reactor performs at least some hydrodeoxygenation.

In an aspect, a method is provided that includes the step of reducing a pressure drop across a hydroprocessing reactor having a reactor feed, where the hydroprocessing reactor produces a hydroprocessing product; the reactor feed is at a temperature from about 550° F. to about 750° F. and is produced by at least combining a bio-oil feed at a temperature of about 100° F. to about 350° F. and a recycled hydroprocessing product of the hydroprocessing reactor at a temperature of about 550° F. to about 800° F.; the step of reducing the pressure drop includes substantially reducing the bio-oil feed supplied to the reactor and supplying the recycled hydroprocessing product to the reactor to generate a mass flux of at least about 2,000 lb/hr/ft$^2$; and where the step of reducing the pressure drop is performed after the theoretical void fraction drops below 26%.

Utilizing the present technology, it has surprisingly been observed that the reactor pressure drop is reduced by up to about 80%. The methods of the present technology may be repeated several times during the reactor run, significantly extending the run length.

DETAILED DESCRIPTION

Figure 1:
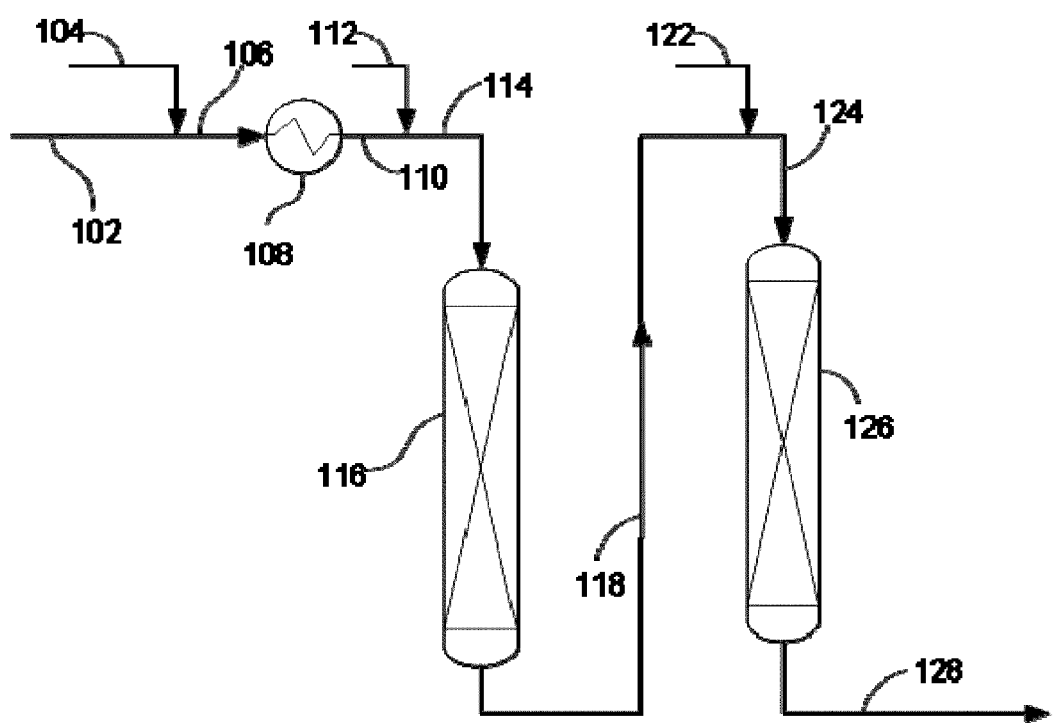
FIG. 1 depicts an exemplary process schematic of a bio-oil hydroprocessing reactor system wherein pressure drop buildup therein is lowered, according to an embodiment of the technology.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "mass flux" will be understood to mean the total mass flow rate of liquid through a reactor divided by the cross sectional area of the reactor and will be described herein in units of lb/hr/ft$^2$.

The present technology provides systems and methods for reducing pressure drop buildup in a bio-oil hydroprocessing reactor as well as maintaining pressure drop. In the upgrading of petroleum products, pressure drop buildup is caused by foulants filling the reactor void. In petroleum products, the bed must either be bypassed or the reactor shut down and the foulants physically removed from the reactor; the foulants cannot be removed through use of a diluent or other dispersing agent run through the reactor. In contrast to petroleum hydroprocessing, the current technology employs a hydrocarbon diluent to remove or redisperse the foulant from an operational reactor. Utilizing the present technology, it has been observed that the reactor pressure drop is reduced by up to about 80%. The methods of the present technology may be repeated several times during the reactor run, significantly extending the run length. Moreover, the present technology allows for hydroprocessing to continue while pressure drop is reduced in the reactor, an option not available for pressure drop buildup in petroleum hydroprocessing.

Pressure drop refers to the difference in pressure ($\Delta P$) across the reactor bed from where a feed first makes contact to where the unreacted feed and/or product exits the reactor bed. Pressure drop buildup thus refers to the increase in the pressure drop over time across a reactor bed, i.e. an increase in the difference in pressure from where a feed first makes contact to where the unreacted feed and/or product exits the reactor bed. As used herein, the term "reduction of pressure drop" or "pressure drop recovery" refers to the lessening of the difference in pressure across a reactor bed. Reduction of pressure drop buildup thus refers to lessening a difference in pressure that has increased from the reactor start of run (SOR) condition.

The relationship between pressure drop and a fixed bed reactor's packing properties and flow conditions is given by correlations such as the Ergun equation, described in many Chemical Engineering Unit Operations text books (e.g. Octave Levenspiel, *Engineering Flow and Heat Exchange*, Plenum Press: New York, 1986; Chapter 6). Variables such as void fraction ϵ, flow rate, fluid density/viscosity, and particle size, all affect pressure drop (ΔP). Pressure drop (ΔP) is particularly sensitive to void fraction; ΔP is proportional to $[1-\epsilon]^3/\epsilon$. For example, as a fixed bed reactor containing a typical three-lobe hydroprocessing catalyst becomes fouled with solid deposits, the theoretical void fraction decreases from 42% (clean) to smaller void fractions causing an essentially linear increase in ΔP. It should be understood that an essentially linear increase in ΔP can be approximated by the formula Y=mX+b where Y=ΔP, X=time, m=the rate of change which is a real number and b is the value for Y when X=0, and a squared correlation coefficient of >0.8. Once the theoretical void fraction drops below about 22%, ΔP starts to rise exponentially, assuming no change in feed composition and reactor inlet conditions. The void fraction left in a reactor can be determined by evaluating the rate of change of ΔP over time: when the ΔP trend is no longer essentially linear, then the theoretical void fraction has dropped to at least about 22%. Thus, such an indicator can be used to determine when implementation of the present methods are most applicable, desirable, or needed.

In one aspect, a method is provided comprising reducing a pressure drop across a hydroprocessing reactor having a reactor feed and producing a hydroprocessing product, where the reactor feed includes a bio-oil feed and a hydrocarbon diluent; and the step of reducing the pressure drop includes stopping or substantially reducing the bio-oil feed supplied to the hydroprocessing reactor and supplying the hydrocarbon diluent to the reactor to generate a mass flux of at least about 1,000 lb/hr/ft² through the hydroprocessing reactor. Such a method is herein termed "hydrothermal treating." In some embodiments, the reactor feed is at a temperature from about 400° F. to about 800° F. The reactor feed may be at a temperature of about 450° F., about 500° F., about 550° F., about 600° F., about 650° F., about 700° F., about 750° F., and ranges between any two of these values or above any one of these values. In some embodiments, the bio-oil is at a temperature from about 100° F. to about 350° F. The bio-oil may be at a temperature of about 120° F., about 140° F., about 160° F., about 180° F., about 200° F., about 220° F., about 240° F., about 260° F., about 280° F., about 300° F., about 320° F., about 340° F., and ranges between any two of these values or above any one of these values. In some embodiments, the bio-oil feed supplied to the reactor is substantially reduced. In some embodiments, the reactor feed further includes hydrogen gas. In some embodiments where the reactor feed include hydrogen gas, the hydrogen gas may be dissolved in at least the hydrocarbon diluent, at least the bio oil, or both.

The term bio-oil is used to refer to any biomass or biomass derivative that is in liquid form when introduced to the fixed bed reactor. Bio-oils can thus include lipids, carboxylic acids, plant oils, animal fats, algal oils, distillates from fermentation of sugars, and liquid fractions derived from pyrolysis of woody biomass. As such, depending upon the source, bio-oils include bio-derived hydrocarbon fractions, fatty acids (e.g. oleic acid, palmetic acid), fatty acid esters (e.g. alkyl esters or glycerides of the fatty acids), shorter carboxylic acids (e.g. acetic acid and formic acid), and other oxygenates such as hydroxyacetaldehyde, acetic acid, acetol, and phenolics. Bio-oils are often characterized by their oxygen content: whereas conventional petrochemical feedstock such as crude oil, coal, and natural gas are hydrocarbons with typically less than 2 wt % total heteroatoms, bio-oils may contain between about 10 wt % and about 40 wt % oxygen. Since oxygenated compounds have lower heating values than hydrocarbons, a primary objective of bio-oil hydroprocessing for manufacture of fuel products is deoxygenation. However, bio-oils may also have less than 2 wt % total heteroatoms, depending on the sources of the bio-oil. Additionally, bio-oils typically cannot meet many fuel specifications such as oxidative stability, water and sediment, copper strip corrosion, ash, and cloud point, unless hydroprocessed. Similarly, bio-oils derived by fast pyrolysis of wood chips or switch grass do not meet motor fuel specifications unless hydroprocessed. In fact, without hydroprocessing, these bio-oils have poor stability (e.g. they become more viscous with time) which limits transportation and storage options.

The bio-oil may be a fatty acid/glyceride containing composition from a feedstock such as tallow, lard, poultry fat/oil, used cooking oil, yellow grease, algae oils, camelina oil, canola oil, castor oil, coffee oil, corn oil, fish oil, hemp oil, Jatropha oil, palm oil, soybean oil, tall oil, tall oil fatty acid, oils from halophiles (i.e. salt water plants like seaweed), or a combination of any two or more thereof. The bio-oil may comprise a composition rich in oxygenated organic compounds derived from fast pyrolysis (including hydro-pyrolysis) of biomass. The source of the pyrolysis-derived bio-oil may be straw, bagasse, nut shells, switch grass, barks of spruce, birch, poplar and other trees, or a combination of any two or more thereof. Pyrolysis of woody biomass includes processes such as fast pyrolysis of ground wood or switch grass in a fluidized bed reactor system comprising circulating sand and/or catalyst. In such reactor systems, the circulating solids media provide the heat for the endothermic pyrolysis reactions. These biomass "cracking" reactions typically occur at temperatures above 800° F. under an oxygen-free atmosphere, thus converting lignocellulose into various hydrocarbons and oxygenates. In some embodiments, the bio-oil comprises a liquid fraction from the fast pyrolysis of biomass. In some embodiments, the liquid fraction is derived from ground wood, ground switch grass, or combinations thereof.

The bio-oil can further contain from about 0.1 wppm to about 3 wt % nitrogen, sulfur, or phosphorus; from about 0.1 wppm to about 1 wt % metals (such as iron and those from Groups I and II of the periodic table); and from about a 0.01 wt % percent to about 30 wt % water and sediments/solids. In some embodiments, the plant oil or animal fat contains nitrogen, sulfur, or phosphorus from about 1 wppm to about 30,000 wppm. In some embodiments, the plant oil or animal fat contains nitrogen, sulfur, or phosphorus from about 10 wppm to about 30,000 wppm. In some embodiments, the plant oil or animal fat contains metals from about 0.1 wppm to about 1 wt %. In some embodiments, the plant oil or animal fat contains metals from about 1 wppm to about 1 wt %. Depending on the source of the bio-oil, the solids present therein include lignin, feather, protein, wax, and plastic (e.g. shredded polyethylene packaging). It should be noted that a fraction of some of these solids may be dissolved and/or solubilized (e.g. as colloids) in the bio-oil, and thus be difficult to remove or redisperse by conventional filtration methods and apparatus.

The present technology utilizes a hydrocarbon diluent to generate a mass flux of at least about 1,000 lb/hr/ft² in order to convert, and/or remove, and/or redisperse the foulant. Thus the present technology avoids shutting down the reactor, or using rupturing disks to bypass a fouled section. Instead, the present technology operates under similar conditions to the hydroprocessing in order to reduce the pressure drop buildup. In fact, the present technology allows for, but does not require, hydroprocessing to continue in a reactor while pressure drop is reduced in the same reactor. In some embodiments, the mass flux is from about 1,000 lb/hr/ft² to about 10,000 lb/hr/ft². In some embodiments, the mass flux is from about 1,000 lb/hr/ft² to about 9,000 lb/hr/ft², about 1,000 lb/hr/ft² to about 8,000 lb/hr/ft², about 1,000 lb/hr/ft² to about 7,000 lb/hr/ft², about 1,000 lb/hr/ft² to about 6,000 lb/hr/ft², or about 1,000 lb/hr/ft² to about 5,000 lb/hr/ft². In some embodiments, the mass flux is at least about 2,000 lb/hr/ft². In some embodiments, the mass flux is from about 2,000 lb/hr/ft² to about 10,000 lb/hr/ft². In some embodiments, the mass flux is from about 2,000 lb/hr/ft² to about 2,000 lb/hr/ft², about 2,000 lb/hr/ft² to about 8,000 lb/hr/ft², about 2,000 lb/hr/ft² to about 7,000 lb/hr/ft², about 2,000 lb/hr/ft² to about 6,000 lb/hr/ft², or about 2,000 lb/hr/ft² to about 5,000 lb/hr/ft². In some embodiments, the mass flux is at least about 2,500 lb/hr/ft².

In some embodiments, the hydrocarbon diluent comprises a recycled product of the hydroprocessing reactor. In some embodiments, the hydrocarbon diluent is supplied at a temperature of about 400° F. to about 800° F. The hydrocarbon diluent may be supplied at a temperature of about 450° F., about 500° F., about 550° F., about 600° F., about 650° F., about 700° F., about 750° F., and ranges between any two of these values or above any one of these values. In some embodiments, the hydrocarbon diluent has a boiling point range of about 300° F. to about 800° F. The boiling point of the hydrocarbon diluent may be about 350° F., about 400° F., about 450° F., about 500° F., about 550° F., about 600° F., about 650° F., about 700° F., about 750° F., and ranges between any of these values or above any one of these values. In some embodiments, the hydrocarbon diluent comprises paraffins in the $C_{11}$ to $C_{24}$ range. In some embodiments, the hydrocarbon diluent comprises n-paraffins in the $C_{11}$ to $C_{24}$ range.

In some embodiments, the reduction of pressure drop is performed after about 100 to about 10,000 reactor volumes of bio-oil have been processed. In some embodiments, the reduction of pressure drop is performed after about 200 to about 9,000, about 200 to about 8,000, about 200 to about 7,000, about 200 to about 6,000, about 200 to about 5,000, or about 200 to about 4,000 reactor volumes of bio-oil have been processed. In some embodiments, the reduction of the pressure drop is performed after 300 to about 3,000 reactor volumes of bio-oil have been processed. In some embodiments, the reduction of the pressure drop is performed after the theoretical void fraction drops below about 30%. In some embodiments, reduction of the pressure drop is performed after the theoretical void fraction drops below 26%. In some embodiments, the reduction of the pressure drop is performed after the theoretical void fraction drops below about 22%. In some embodiments, reduction of the pressure drop is performed after the theoretical void fraction drops below 18%. In some embodiments, the reduction of the pressure drop is performed after the rate of $\Delta P$ increase is about 0.1 psi/hr. In some embodiments, the reduction of the pressure drop is performed after the rate of $\Delta P$ increase is about 0.25 psi/hr. In some embodiments, the reduction of the pressure drop is performed after the rate of $\Delta P$ increase is about 0.5 psi/hr. In some embodiments, the reduction of the pressure drop is performed after the rate of $\Delta P$ increase is about 0.75 psi/hr. In some embodiments, the reduction of the pressure drop is performed after the rate of $\Delta P$ increase is about 1 psi/hr.

In some embodiments, the method produces an overall $\Delta P$ decrease from about 10% to about 99%. In some embodiments, the method produces an overall $\Delta P$ decrease from about 25% to about 99%, from about 30% to about 99%, from about 35% to about 99%, from about 40% to about 99%, from about 45% to about 99%, or from about 50% to about 99%. In some embodiments, the method produces an overall $\Delta P$ decrease from about 20% to about 95%, from about 20% to about 90%, or from about 20% to about 85%, or from about 20% to about 80%. In some embodiments, the method produces an overall $\Delta P$ decrease from about 25% to about 80%, from about 30% to about 80%, from about 35% to about 80%, from about 40% to about 80%, from about 45% to about 80%, or from about 50% to about 80%. The overall $\Delta P$ decrease may be greater than any one of these recited values for the overall $\Delta P$ decrease.

In some embodiments, the reduction of the pressure drop is performed periodically. In some embodiments, the periodic reduction of the pressure drop is performed after about 2 days to about 2 weeks since either the start of hydroprocessing or the last reduction of pressure drop. In some embodiments, the periodic reduction of the pressure drop is performed after about 2 weeks to about 4 months since either the start of hydroprocessing or the last reduction of pressure drop. In some embodiments, the periodic reduction of the pressure drop is performed after about 4 months since either the start of hydroprocessing or the last reduction of pressure drop. The periodic reduction of pressure drop may occur at 2 months, at 4 months, at 6 months, at 8 months, at 10 months, at 12 months, or any range between any two of these values or greater than any one of these values.

In some embodiments, substantially reducing the bio-oil feed includes supplying the hydrocarbon diluent to the reactor at a volumetric ratio of at least 10:1 of hydrocarbon diluent to bio-oil. In some embodiments, substantially reducing the bio-oil feed includes supplying the hydrocarbon diluent to the reactor at a volumetric ratio of at least 15:1 hydrocarbon diluent to bio-oil. In some embodiments, the step of reducing the pressure drop does not interrupt production of the hydroprocessing product.

In some embodiments, the hydroprocessing reactor comprises a graded bed. In some embodiments, the graded bed comprises high void and high macro-porosity media. High void means at least about 50% or higher void fraction; the term "high macro-porosity" means the media includes pore diameters greater than 100 nm. In some embodiments, the graded bed comprises a catalyst that includes Co, Mo, Ni, Pt, Pd, Ru, W, NiMo, NiW, CoMo, or combinations of any two or more thereof. In some embodiments, the graded bed comprises a catalyst selected from the group consisting of NiMo, CoMo, and combinations thereof.

In an aspect, a method is provided that includes the step of reducing a pressure drop across a hydroprocessing reactor having a reactor feed, where the hydroprocessing reactor produces a hydroprocessing product; the reactor feed is at a temperature from about 550° F. to about 750° F. and is produced by at least combining a bio-oil feed at a temperature of about 100° F. to about 350° F. and a recycled hydroprocessing product of the hydroprocessing reactor at a temperature of about 550° F. to about 800° F.; the step of reducing the pressure drop includes substantially reducing the bio-oil feed supplied to the reactor and supplying the recycled hydroprocessing product to the reactor to generate a mass flux of at least about 2,000 lb/hr/ft²; and where the step of reducing the pressure drop is performed after the theoretical void fraction drops below 26%. The reactor feed may be at a temperature from about 450° F., about 500° F., about 550° F., about 600° F., about 650° F., and ranges between any two of these values or above any one of these values. The bio-oil feed may be at a temperature of about 120° F., about 140° F., about 160° F., about 180° F., about 200° F., about 220° F., about 240° F., about 260° F., about 280° F., about 300° F., about 320° F., about 340° F., and ranges between any two of these values or above any one of these values. The recycled hydroprocessing product may be supplied at a temperature of about 600° F., about 650° F., about 700° F., about 750° F., and ranges between any two of these values or above any one of these values. The boiling point of the recycled hydroprocessing product may be about 350° F., about 400° F., about 450° F., about 500° F., about 550° F., about 600° F., about 650° F., about 700° F., about 750° F., and ranges between any of these values or above any one of these values.

Now, turning to the figures, a hydroprocessing system with two fixed bed reactors, according to an embodiment of the present technology, is illustrated in FIG. 1. The hydroprocessing system has two fixed bed reactors, a first reactor 116 and a second reactor 126. A bio-oil is split into a first stream 112 directed to the first reactor 116, and a second stream 122 directed to the second reactor 126.

The bio-oil first stream 112 is combined with a heated hydrocarbon diluent 110 to form a first reactor feed 114. The heated hydrocarbon diluent 110 is formed from a hydrocarbon diluent 102 and a hydrogen-rich gas 104, combined to make a hydrogen-containing gas 106 prior to heating in a heater 108. The volumetric ratio of hydrocarbon diluent 102 to the bio-oil first stream 112 is from about 0.5:1 to about 10:1, about 0.5:1 to about 8:1, about 0.5:1 to about 6:1; or about 0.5:1 to about 5:1. In some embodiments, the volumetric ratio is from about 1:1 to about 10:1, about 1:1 to about 8:1, about 1:1 to about 6:1; or about 1:1 to about 5:1. In some embodiments, the volumetric ratio is from about 1:1 to about 3:1.

The hydrogen-rich gas 104 contains from about 70 mol % to 100 mol % hydrogen. In some embodiments, the hydrogen-rich gas contains about 75 mol % to about 98 mol % hydrogen. The hydrocarbon diluent 102, the hydrogen-rich gas 104, the hydrogen-containing gas 106, the heated hydrocarbon diluent 110, the bio-oil first stream 112, and the first reactor feed 114 are at pressures in the range of about 500 psig to about 4,000 psig. The heater 108 may be a single shell and tube heat exchanger, or combinations of exchangers in series, in parallel, or both, with the heating source a utility stream (e.g. hot oil or high pressure steam) or another process stream such as effluent from one of the fixed bed reactors. The heater 108 is operated such that the heated hydrocarbon diluent 110 is in the range of about 400° F. to about 800° F.

The first reactor 116 and second reactor 126 are loaded with supported catalysts including those having a catalytic metal selected from Group VIII (IUPAC Groups 8-10) and Group VIB (IUPAC Group 6) elements, alone or in combinations of any two or more thereof. In some embodiments, the catalyst includes Co, Mo, Ni, Pt, Pd, Ru, W, NiMo, NiW, CoMo, or combinations of any two or more thereof. In some embodiments, the catalyst selected from the group consisting of NiMo, CoMo, and combinations thereof. Hydroprocessing catalyst supports are typically aluminum oxide, or combinations of aluminum oxide with phosphorus oxide and silicon oxide. When a sulfided catalyst such as NiMo or CoMo is used while the bio-oil or the hydrocarbon diluent have essentially no organo-sulfur compounds therein, a sulfiding agent (compounds that thermally and/or catalytically decomposes into $H_2S$ and hydrocarbons) is optionally introduced to the bio-oil or hydrocarbon diluent.

The reactors 116 and 126 may be graded with inert and low activity high void media. For the illustrative example of a 30 ft bed, a grading scheme (from top to bottom) comprises a 9 to 12 inch layer of 16 mm wagon-wheel high void inert media, a 12 to 18 inch layer of 8 mm NiMo active rings, a 12 to 18 inch layer of 4.8 mm NiMo active rings, and a 25 to 27 ft layer of conventional three-lobe or four-lobe NiMo or CoMo catalyst in the 1.3 to 2.5 mm size range. The high void inert media and active rings are sold by Haldor Topsoe and Criterion under the names TK-10, TK-30, and SENTRY™ OptiTrap series of products. In some embodiments, each reactor has a plurality of beds with optional gas quench for limiting adiabatic temperature rise from exothermic hydrogenation reactions. In some embodiments, the graded bed comprises a catalyst that includes Co, Mo, Ni, Pt, Pd, Ru, W, NiMo, NiW, CoMo, or combinations of any two or more thereof. In some embodiments, the graded bed comprises a catalyst selected from the group consisting of NiMo, CoMo, and combinations thereof.

The reactors 116 and 126 are operated at pressures in the range of about 500 psig to about 4,000 psig. In some embodiments, reactors 116 and 126 are operated at pressures in the range of about 700 psig to about 2,300 psig. The reactors are operated at temperatures in the range of about 400° F. to about 800° F. The ratio of the hydrogen-rich gas 104 to the bio-oils 112 and 122 is from about 2,000 SCF/Bbl to about 10,000 SCF/Bbl. The ratio of bio-oil 112 volumetric flow rate to volume of active catalyst is from 0.2 to 10 $hr^{-1}$, and may be from 0.5 to 5 $hr^{-1}$.

The hydroprocessed bio-oil from reactor 116 is substantially converted to a hydrocarbon product which forms the liquid phase of a two-phase product 118. The two-phase product 118 is combined with the bio-oil second stream 122 to form a second reactor feed 124. The volumetric ratio of the hydrocarbon phase of the two-phase product 118 to the bio-oil second stream 122 is similar to the ratio of hydrocarbon diluent 102 to the bio-oil first stream 112; that is, from about 0.5:1 to about 10:1, about 0.5:1 to about 8:1, about 0.5:1 to about 6:1; or about 0.5:1 to about 5:1, from about 1:1 to about 10:1, about 1:1 to about 8:1, about 1:1 to about 6:1; or about 1:1 to about 5:1. In some embodiments, the volumetric ratio is from about 1:1 to about 3:1. The second reactor 126 operates under the same operating range as first reactor 116. Due to the additional liquid flow from introduction of the bio-oil second stream 122, second reactor 126 may be larger than first reactor 116.

The hydroprocessed bio-oil from reactor 126 is substantially converted to a hydrocarbon product which forms the liquid phase of a two-phase product 128. The two-phase product 128 is separated into the hydrocarbon product and a gas fraction in a separation unit downstream (not shown). The gas, mainly unreacted $H_2$, is treated (e.g. through water wash/separation in a cold separator drum and/or scrubber) to remove components such as water, carbon oxides, ammonia, and hydrogen sulfide, formed during HDO, HDN, and HDS reactions. The treated gas is then combined with makeup $H_2$ (not shown) to produce the hydrogen-rich gas 104 composition. In some embodiments, hydrogen-rich gas 104 is not combined with recycle treat gas.

The hydrocarbon product may be directed to product fractionation downstream, to further hydroprocessing (e.g. hydrocracking/isomerization), or both, to provide the desired hydrocarbon biofuel products, such as renewable diesel, jet fuel, and gasoline. Alternatively, the hydrocarbon product may be partially recycled as the hydrocarbon diluent 102.

After a given time of hydroprocessing the pressure drop across reactor 116 transitions from an essentially linear increase to an exponential increase. The time for this transition to occur may range from about 2 days to about 12 months, or may be after about 100 to about 10,000 reactor volumes of bio-oil has been processed. This can also be determined by the rate of the pressure drop buildup. At this point, the flow of bio-oil 112 is discontinued or substantially reduced while maintaining hydrocarbon diluent flow 102 and hydrogen flow 104 at aforementioned conditions. When the bio-oil flow to the reactor 116 is substantially reduced, the volumetric ratio of the hydrocarbon diluent 102 to the bio-oil 112 may be greater than 10:1 and may be greater than 15:1. The temperature of the heated hydrocarbon diluent 110 is maintained from about 400° F. to about 800° F. The hydrocarbon diluent flow rate is modified as necessary to ensure at least 1,000 lb/hr/ft$^2$ mass flux through the reactor 116. At these hydrothermal treating conditions, the pressure drop across reactor 116 decreases at a rate of from about 1 psi/hr in the beginning of the hydrothermal treating cycle down to about 0.1 psi/hr later in the cycle, and achieving an overall ΔP decrease from about 10% to about 99%. Without wishing to be bound by any theory, it is believed that the surprising decrease in pressure drop is due to dispersion of friable bio-based solid deposits within the fixed bed reactor promoted by the turbulent flow of hot hydrocarbon diluent and potential thermal decomposition of the deposits therein.

Once the rate of ΔP decrease drops substantially below 0.1 psi/hr, or as dictated by other operating considerations, the flow of bio-oil 112 to reactor 116 is reestablished. At this point the flow of bio-oil 122 to reactor 126 may be stopped or substantially reduced, thus allowing the second reactor to undergo the hydrothermal treating cycle. Here the hydrocarbon diluent utilized in the hydrothermal treatment is the hydrocarbon phase of the two-phase product 118. When the bio-oil flow to reactor 126 is substantially reduced, the ratio of the hydrocarbon diluent in the two-phase product 118 to the bio-oil 122 is greater than 10:1; in some embodiments, the ratio is greater than 15:1. The adiabatic temperature rise due to the hydroprocessing reactions within reactor 116 ensures that the temperature of the two-phase product 118 is in the range of about 400° F. to about 800° F. Similarly, the flow rate of bio-oil 112 and the hydrocarbon diluent 120 are such that mass flux through reactor 126 is greater than 1,000 lb/hr/ft$^2$. After ΔP has decreased in the second reactor 126, the flow of bio-oil second stream 122 to second reactor 126 is reestablished.

One of the attractive features of the above-described example is that bio-oil throughput and fuel production are not substantially interrupted during the ΔP reducing operation. However, it will be recognized by those of ordinary skill in the art that the operation that avoids reactor shutdown and catalyst skimming or replacement will be of interest even if bio-oil flow is interrupted for a 24-72 hour time period whenever reactor pressure drop starts to increase exponentially or approaches design limits. Moreover, the benefits derived by the processes and above-described example can be realized at any time during the reactor run, even when reaching the design limits of the reactor or exponential ΔP rise are not imminent.

The present technology, thus generally described, will be understood more readily by reference to the following examples, which are provided by way of illustration and are not intended to be limiting of the present technology.

EXAMPLES

A renewable diesel hydroprocessing reactor system similar to that described in the embodiment of FIG. 1 was operated with a bio-oil feedstock comprising mainly of inedible tallow and yellow grease. The reactor system's two reactors each included a top bed and a bottom bed with inter-bed gas quench. The hydrocarbon diluent for the reactor system was the recycled hydrocarbon product fraction.

Figure 2:
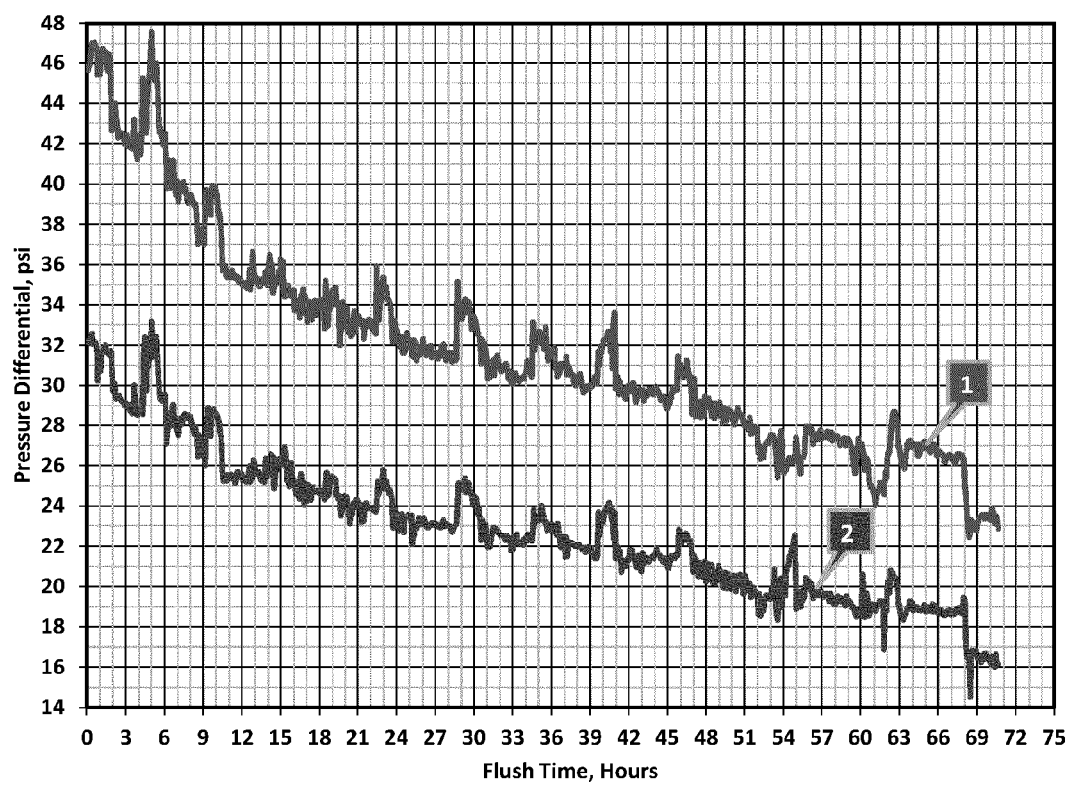
FIG. 2 is a graph showing pressure drop reduction as a function of time, according to the Examples.

After about 1,000 reactor volumes of bio-oil was processed through the reactor system, the pressure drop across the top bed of the first reactor transitioned from an essentially linear rate of increase to an exponential one. At this point the bio-oil flow to the first reactor was stopped while maintaining diluent to the reactor at an inlet temperature of about 670° F. and a mass flux of about 2,800 lb/hr/ft$^2$. The pressure drop across the top bed of the first reactor decreased as shown by curve 1 of FIG. 2. The overall pressure drop decrease was from an initial ΔP of 46 psi to a final ΔP of 26 psi to provide a 43% reduction in the pressure drop.

Later in the run, the bio-oil feed to the second reactor was stopped in order to hydrothermally treat the second reactor and reduce the pressure drop across its top bed. The second reactor inlet temperature was about 670° F., with a total hydrocarbon liquid mass flux of 2,600 lb/hr/ft$^2$. The pressure drop across the top bed of the second reactor decreased as shown by curve 2 of FIG. 2. The overall pressure drop decrease was from an initial ΔP of 32 psi to a final ΔP of 19 psi to provide a 41% reduction in the pressure drop.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method comprising reducing a pressure drop across a hydroprocessing reactor having a reactor feed and producing a hydroprocessing product, wherein:
   the reactor feed comprises a bio-oil feed and a hydrocarbon diluent at a volumetric ratio of hydrocarbon diluent to bio-oil feed from about 1:1 to about 3:1;
   reducing the pressure drop is performed after a rate of pressure drop increase in the hydroprocessing reactor is about 0.1 psi/hr;
   reducing the pressure drop comprises
      supplying a volumetric ratio of hydrocarbon diluent to bio-oil feed of at least about 10:1 to the reactor to generate a mass flux of at least about 1,000 lb/hr/ft$^2$; and
      re-establishing the volumetric ratio of hydrocarbon diluent to bio-oil feed from about 1:1 to about 3:1 once a rate of pressure drop decrease is below about 0.1 psi/hr.

2. The method of claim 1, wherein the mass flux is from about 1,000 lb/hr/ft$^2$ to about 10,000 lb/hr/ft$^2$.

3. The method of claim 1, wherein the mass flux is at least about 2,000 lb/hr/ft$^2$.

4. The method of claim 1, wherein the hydrocarbon diluent comprises the hydroprocessing product of the hydroprocessing reactor.

5. The method of claim 1, wherein reducing the pressure drop comprises supplying the hydrocarbon diluent to the hydroprocessing reactor at a volumetric ratio of at least 15:1 hydrocarbon diluent to bio-oil.

6. The method of claim 1, wherein the hydrocarbon diluent is supplied at a temperature of about 400° F. to about 800° F.

7. The method of claim 1, wherein the hydrocarbon diluent has a boiling point of about 300° F. to about 650° F.

8. The method of claim 1, wherein the bio-oil comprises a lipid, a carboxylic acid, a plant oil, animal fat, algal oil, a distillate from the fermentation of sugars, or a liquid fraction derived from the fast pyrolysis of biomass.

9. The method of claim 8, wherein the plant oil, animal fat, or both, contains nitrogen, sulfur, or phosphorus from about 0.1 wppm to about 30,000 wppm.

10. The method of claim 1, wherein the bio-oil comprises a liquid fraction from the fast pyrolysis of biomass.

11. The method of claim 10, wherein the liquid fraction is derived from ground wood, ground switch grass, or combinations thereof.

12. The method of claim 1, wherein the hydroprocessing reactor comprises a graded bed.

13. The method of claim 12, wherein the graded bed comprises high void and high macro-porosity media.

14. The method of claim 13, wherein the graded bed comprises a catalyst comprising Co, Mo, Ni, Pt, Pd, Ru, W, NiMo, NiW, or CoMo.

15. The method of claim 1, wherein the reactor feed further comprises hydrogen gas.

16. The method of claim 1, wherein the hydroprocessing reactor performs at least some hydrodeoxygenation.

17. A method comprising reducing a pressure drop across a hydroprocessing reactor having a reactor feed, wherein:
   the hydroprocessing reactor produces a hydroprocessing product;
   the reactor feed is at a temperature from about 550° F. to about 750° F. and is produced by at least combining
      a bio-oil feed at a temperature of about 100° F. to about 350° F.; and
      a recycled hydroprocessing product of the hydroprocessing reactor at a temperature of about 550° F. to about 800° F.;
      wherein the volumetric ratio of recycled hydroprocessing product to bio-oil feed is from about 1:1 to about 3:1;
   reducing the pressure drop is performed after the theoretical void fraction drops below 26% and comprises
      supplying a volumetric ratio of recycled hydroprocessing product to bio-oil feed of at least about 10:1 to the reactor to generate a mass flux of at least about 2,000 lb/hr/ft$^2$; and
      re-establishing the volumetric ratio of hydrocarbon diluent to bio-oil feed from about 1:1 to about 3:1 once a decrease in pressure drop is in the range from about 10% to about 99%.

18. A method comprising reducing a pressure drop across a hydroprocessing reactor having a reactor feed and producing a hydroprocessing product, wherein:
   the reactor feed comprises
      a bio-oil feed and a hydrocarbon diluent at a volumetric ratio of hydrocarbon diluent to bio-oil feed from about 1:1 to about 3:1; and
      the bio-oil comprises a plant oil, animal fat, or both;
   reducing the pressure drop is performed after a rate of pressure drop increase in the hydroprocessing reactor is about 0.1 psi/hr;
   reducing the pressure drop comprises
      stopping the reactor feed to the hydroprocessing reactor and supplying the hydrocarbon diluent to the hydroprocessing reactor to generate a mass flux of about 1,000 lb/hr/ft$^2$ to about 10,000 lb/hr/ft$^2$; and
      re-establishing the supply of reactor feed once a decrease in pressure drop is in the range from about 10% to about 99%.

19. The method of claim 18, wherein the hydrocarbon diluent comprises the hydroprocessing product of the hydroprocessing reactor.

20. The method of claim 18, wherein the hydrocarbon diluent is supplied at a temperature of about 400° F. to about 800° F. and has a boiling point of about 300° F. to about 650° F.

21. The method of claim 18, wherein the hydroprocessing reactor comprises a graded bed; and the graded bed comprises a comprises a NiMo catalyst, a CoMo catalyst, or a combination thereof.

22. The method of claim 18, wherein reducing the pressure drop comprises re-establishing the supply of reactor feed once the decrease in pressure drop is in the range from about 25% to about 80%.

23. The method of claim 18, wherein the mass flux is from about 2,000 lb/hr/ft$^2$ to about 10,000 lb/hr/ft$^2$.

* * * * *